United States Patent
Fries et al.

(10) Patent No.: US 9,521,280 B2
(45) Date of Patent: Dec. 13, 2016

(54) SYSTEMS AND METHODS FOR DISPLAY OF REGULATORY INFORMATION RELATED TO LABELING

(71) Applicant: HELLERMANNTYTON CORPORATION, Milwaukee, WI (US)

(72) Inventors: Todd Fries, Waukesha, WI (US); Kevin D. Bereswill, Antigo, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 28 days.

(21) Appl. No.: 14/096,290

(22) Filed: Dec. 4, 2013

(65) Prior Publication Data
US 2015/0156342 A1     Jun. 4, 2015

(51) Int. Cl.
*H04N 1/00*      (2006.01)
*G06K 15/02*     (2006.01)
(Continued)

(52) U.S. Cl.
CPC .......... *H04N 1/00413* (2013.01); *B42D 15/00* (2013.01); *G06F 3/1203* (2013.01);
(Continued)

(58) Field of Classification Search
CPC ............ H04N 1/00413; H04N 1/00411; H04N 1/00307; H04N 2201/0075; H04N 2201/0082; G06K 15/024; B42D 15/00; G06F 3/1203; G06F 3/1253; G06F 3/1267
(Continued)

(56) References Cited

U.S. PATENT DOCUMENTS

| 6,379,059 B2 | 4/2002 | Kaplan |
| 6,607,316 B1 | 8/2003 | Petteruti et al. |

(Continued)

FOREIGN PATENT DOCUMENTS

| DE | 20317912 U1 | 4/2004 |
| DE | 60033672 T2 | 11/2007 |

(Continued)

OTHER PUBLICATIONS

Brother iPrint and wireless printing smartphone app. www.brother-usa.com, Dec. 3, 2013.
(Continued)

*Primary Examiner* — Allen H Nguyen
(74) *Attorney, Agent, or Firm* — Ryan Kromholz & Manion, S.C.

(57) ABSTRACT

Provided are embodiments of systems and methods related to labeling, and more particular to labeling that may be guided by regulatory requirements. A system comprises an electronic device having a user interface capable of displaying a WYSIWYG image of a label and providing access to regulatory information related to the displayed label. The system may further determine compliance with regulatory guidelines by a user-edited label. The electronic device may be, or be in communication with, a label printer to initiate printing of a displayed label. A method includes the steps of accessing a WYSIWYG image of a label and accessing regulatory information related to such label using a handheld electronic device. The method may further include the steps of verifying compliance of a label with regulatory guidelines or requirements and initiating printing of such label, which may be adhesive.

11 Claims, 13 Drawing Sheets

(51) Int. Cl.
*B42D 15/00* (2006.01)
*G06F 3/12* (2006.01)

(52) U.S. Cl.
CPC .......... *G06F 3/1253* (2013.01); *G06F 3/1267* (2013.01); *G06K 15/024* (2013.01); *H04N 1/00307* (2013.01); *H04N 1/00411* (2013.01); *H04N 2201/0075* (2013.01); *H04N 2201/0082* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 6,892,350 | B1* | 5/2005 | Oba et al. ..................... | 715/716 |
| 6,899,477 | B2 | 5/2005 | Petteruti et al. | |
| 7,126,716 | B1 | 10/2006 | Kaufman et al. | |
| 7,278,579 | B2* | 10/2007 | Loffredo et al. ......... | 235/462.46 |
| 7,990,567 | B2 | 8/2011 | Vleurinck et al. | |
| 8,359,640 | B2 | 1/2013 | Hashimoto | |
| 8,639,525 | B2* | 1/2014 | Levine ................. | G06F 19/326 |
| | | | | 705/2 |
| 2004/0107022 | A1* | 6/2004 | Gomez .......................... | 700/231 |
| 2006/0279779 | A1 | 12/2006 | Kaufman et al. | |
| 2007/0146474 | A1* | 6/2007 | Kameda et al. .............. | 347/262 |
| 2008/0093027 | A1* | 4/2008 | Niwa et al. ................... | 156/387 |
| 2012/0072969 | A1* | 3/2012 | Aratsu .................. | G06F 21/604 |
| | | | | 726/1 |
| 2013/0141236 | A1* | 6/2013 | Chu ........................ | 340/539.12 |
| 2013/0215467 | A1* | 8/2013 | Fein ....................... | G06F 3/1204 |
| | | | | 358/1.15 |

FOREIGN PATENT DOCUMENTS

| | | |
|---|---|---|
| EP | 2025475 A2 | 2/2009 |
| JP | 2008090470 A | 4/2008 |
| JP | 4260824 B2 | 4/2009 |
| JP | 2012091519 A | 5/2012 |
| JP | 2013030198 A | 2/2013 |
| WO | WO2009/147972 A1 | 12/2009 |

OTHER PUBLICATIONS

Epson iPrint and wireless printing smartphone app. www.epson.com, May 8, 2013.

Brady BMP51/53 label marker featuring network card for wireless printing and mobile app for android phone, Dec. 3, 2013.

www.cooperbussmann.com, "New FC2 Mobile Application from Cooper Bussmann Delivers Quick Fault Current Calculations Anytime, Anywhere" Cooper Bussman News Release, Jul. 8, 2013.

Cooper Bussmann, FC2 available fault current calculator fact sheet, 2013.

www.bradyid.com. "New Brady BMP53 Label Maker features network card for wireless printing." Nov. 7, 2011.

* cited by examiner

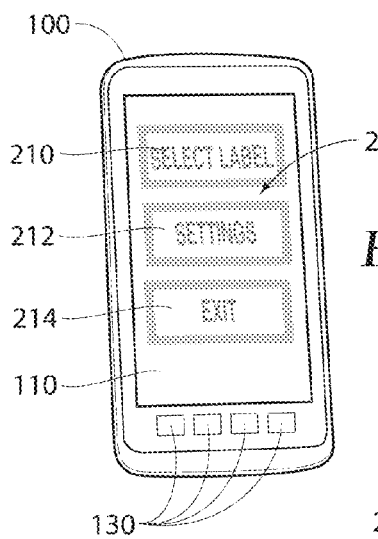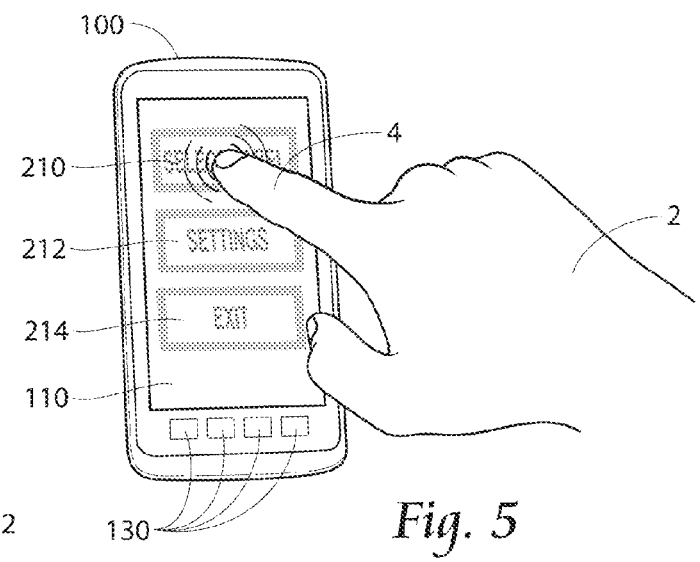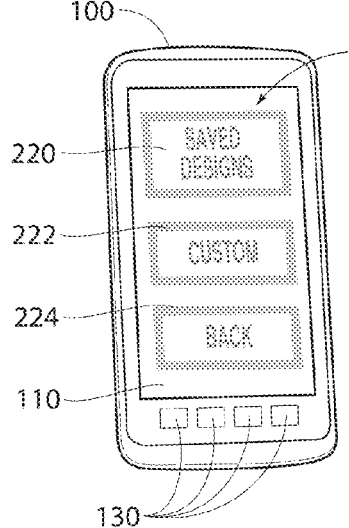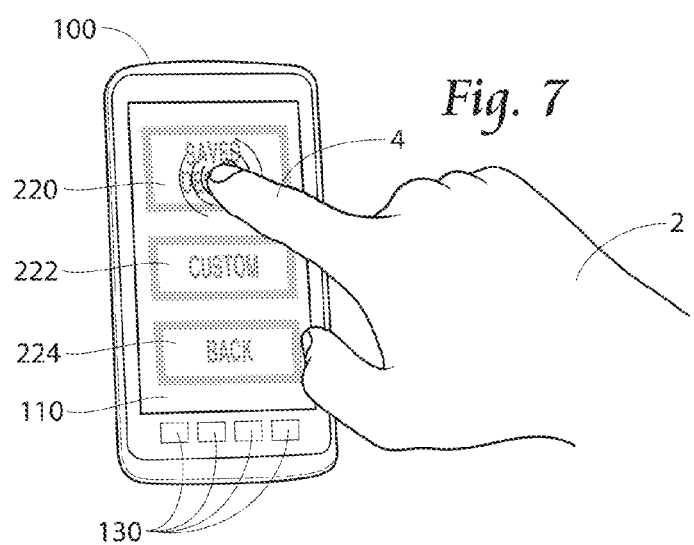

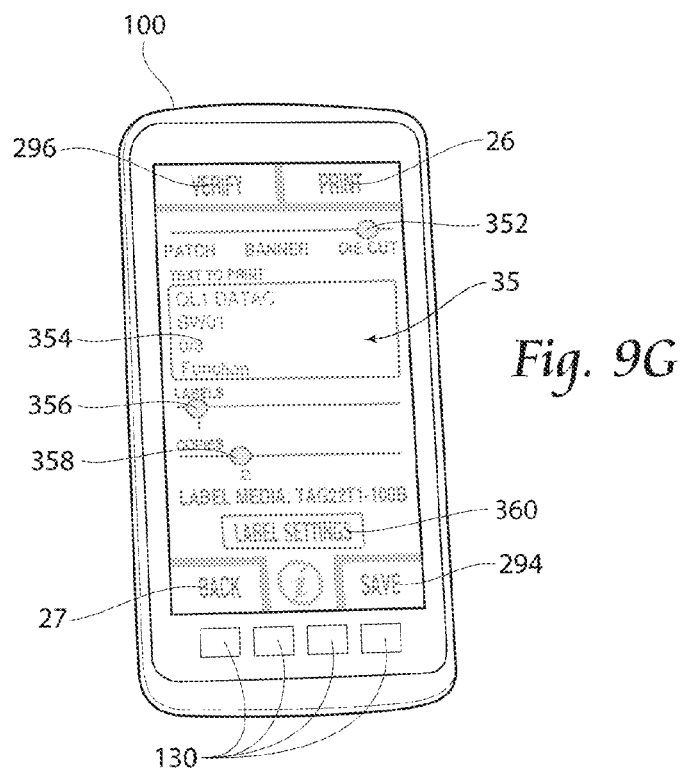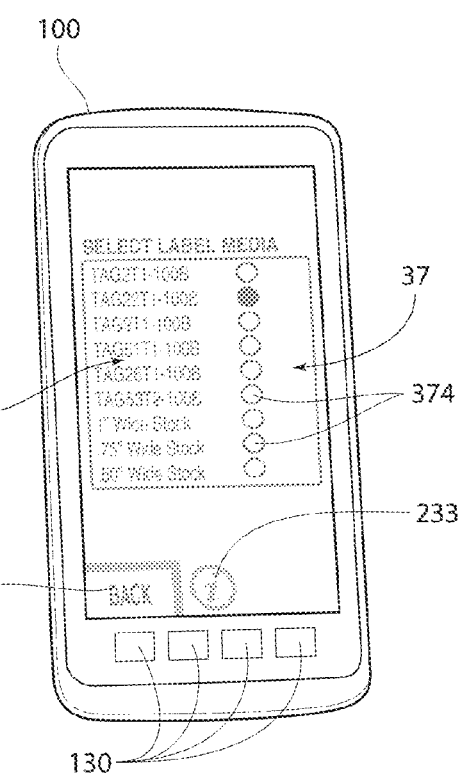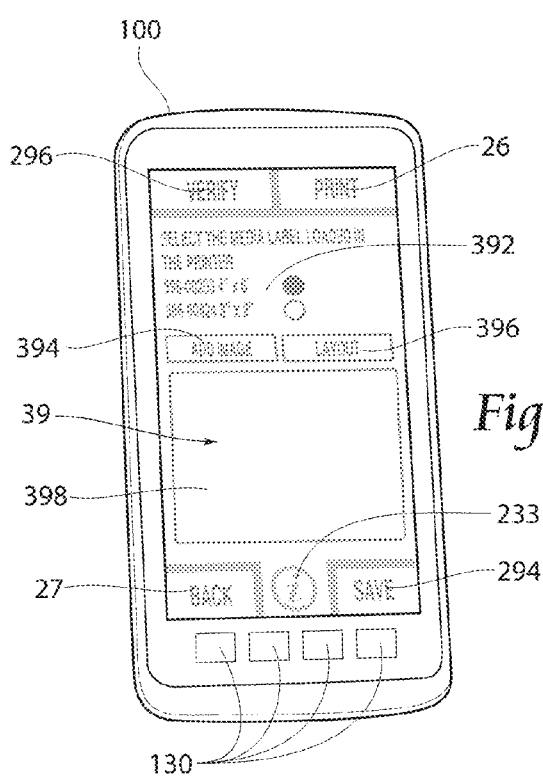
Fig. 9G
Fig. 9H
Fig. 9I

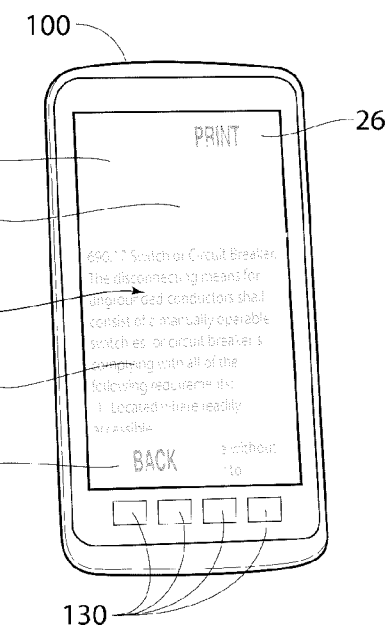
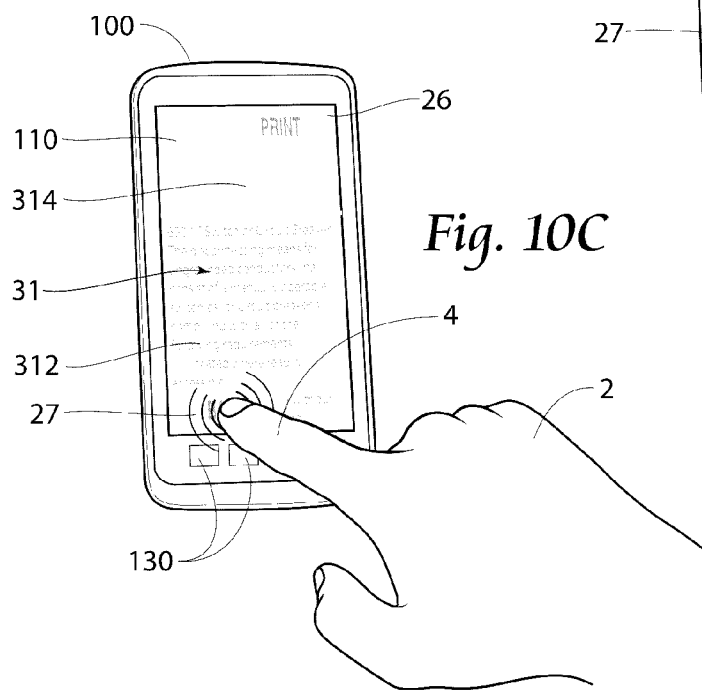
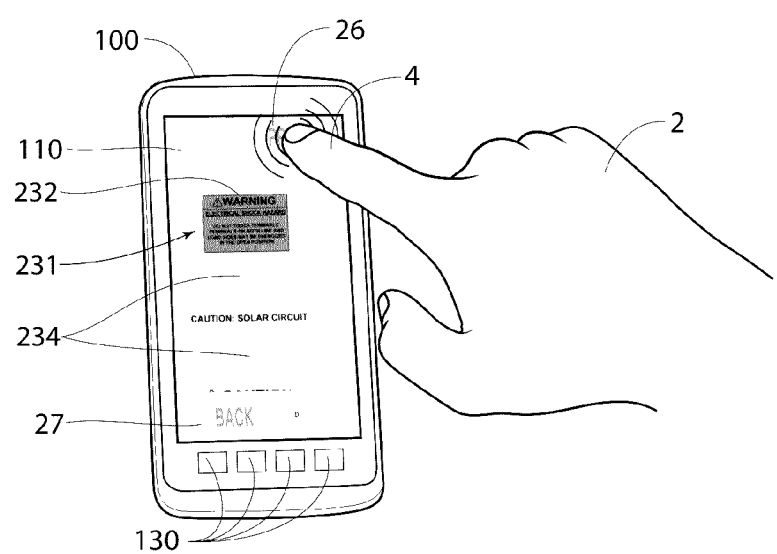

SYSTEMS AND METHODS FOR DISPLAY OF REGULATORY INFORMATION RELATED TO LABELING

BACKGROUND OF THE INVENTION

Embodiments according to the present invention relate generally to labeling, and more specifically to a display of regulatory information related to a label to be or that has been printed.

Clear communications are important. However, when a person's life is on the line, clear communications are critical. As a society, people generally rely upon written communications to convey information regarding products and/or services. Primarily, such information may be conveyed by way of labeling secured or otherwise coupled to for-sale or in-use things including but not limited to products, devices, apparatus, machines, foodstuffs, pharmaceuticals, or packaging thereof.

For instance, certain labels may be placed on, e.g., a foodstuff, to indicate ingredients therein. This information may have varying criticality to different consumers. For instance, for those people with severe food allergies, it is very important to understand what allergens may be contained in the foodstuff. For those people without allergies, other information on a food label may be important, such as the number of calories (or kilocalories), the amount of sodium, or the amount of carbohydrates.

Another purpose for labeling may be to indicate information about the functional limits of a product prior to the use of the product. An example of this type of labeling may be the amount of water resistance for an electronic device, such as an electronic wristwatch (e.g., 50 meters).

A label may additionally or alternatively include instructions for use of an associated item, on which the label may be adhered. For instance, a label may be adhered to a bottle of pharmaceutical medication indicating time and dosage amount for the user.

Yet another type of information that may be conveyed by labeling may be the operating functionality of in-use items. For instance, on the outside of a circuit breaker panel, or on a label wrapped around an electrical wire, certain information about the operating current and/or voltage may be displayed.

While prior labeling devices have provided standardized label templates, there remains a need in the art of labels and label printing for systems and methods that may be used to display regulatory information related to a given label.

SUMMARY OF THE INVENTION

Embodiments according to the present invention relate to systems and methods that may be used to display regulatory information related to a given label that is yet to be or has been printed for affixation or association with an item.

A system according to the present invention includes an electronic system having a printer and a user interface with a graphic display. On the graphic display, there is an image a label to be printed by the printer. Accessible by the electronic system is regulatory information related to the label. A selectable option is displayed on the graphic display, and when the selectable option is activated, the regulatory information is accessed by the electronic system, and at least a portion of the regulatory information is displayed on the graphic display.

The electronic system may include a handheld electronic device in communication with the printer, where the user interface is provided on the handheld electronic device. A handheld electronic device may be in wired or wireless communication with the printer. The regulatory information accessible by the handheld device may be stored in a database (which may be stored in nonvolatile memory on the handheld device or otherwise accessed, such as by access over a network such as the Internet) relating the regulatory information to a representation (e.g. identifier, such as an alpha-numeric representation, digital representation, encrypted representation, part number, etc.) of the label. The database may further associate an intended use for a given label.

A system according to the present invention may further comprise a hierarchical menu system displayed on the display of the user interface, wherein the image is displayed as a result of human interaction with the hierarchical menu system. The hierarchical menu system may include a selectable characteristic of label media intended to be used to print a selected and/or edited label. The characteristic may be a physical label media configuration, such as a continuous adhesive-backed tape, or plurality of discrete adhesive-backed label portions, coupled to a continuous releasable backing material. The releasable backing material may be perforated, preferably in a direction that is substantially orthogonal to a label media feed direction in the printer, or the material may be imperforate. The label media characteristic may additionally or alternatively reflect the appearance of label media, such as matter printed or otherwise displayed on the label media. Printed matter may include text and/or graphics. The hierarchical menu system may include (or it can be provided separate and apart from the menu system) at least one database search function that accepts an alpha-numeric query from a user and compares it against an intended use of a yet-to-be-specified or -selected label. The search results returns from the database, for display, a list of label representations related to the intended use. An additional or alternative search function may accept an alpha-numeric query from a user and compare it against an alpha-numeric identifier related to a yet-to-be-specified or -selected label. The search results returns from the database, for display, a list of label representations related to the alpha-numeric identifier.

A method of providing information according to the present invention includes an image display step and an information display step. In the image display step, an image is displayed on an electronic device, such as on a user interface display. In the information display step, regulatory information related to said image is displayed on the electronic device, such as on the user interface display.

According to an aspect of a method of the present invention, the electronic device may be capable of transferring image data, which is used to display the image, to a second device, which may be a printer, such as a label printer. The transferring may occur at least partially over a wireless electronic communications interface.

According to another aspect of a method according to the present invention, such method may further include the steps of changing the image to create an edited image and displaying the edited image on the electronic device. The regulatory information may include regulatory guidelines governing one or more aspects of a label to be created from the edited image, and the electronic device may be used to compare one or more aspects of the image or the edited image to the regulatory guidelines to determine whether the one or more aspects of the image or the edited image comply with the regulatory guidelines. As a result of the comparison, an indication may be displayed on the electronic device, where the indication conveys one of compliance and non-compliance with the regulatory guidelines. Regulatory guidelines that govern one or more aspects of a label to be created according to the present invention may be defined by a governmental agency, a trade association, or even a user of the electronic device.

BRIEF DESCRIPTION OF THE DRAWINGS

FIG. 4 is a front elevation view of the device of FIG. 2 showing a second embodiment of a user interface displayed on the device.

FIG. 5 is a front elevation view of the embodiment of FIG. 4, further including a human hand interacting with the user interface.

FIG. 6 is a front elevation view of the device of FIG. 2 showing a third embodiment of a user interface displayed on the device.

FIG. 7 is a front elevation view of the embodiment of FIG. 6, further including a human hand interacting with the user interface.

FIG. 9G is a front elevation view of the device of FIG. 2 showing a third blank label edit embodiment of a user interface.

FIG. 9H is a front elevation view of the device of FIG. 2 showing a media selection embodiment of a user interface.

FIG. 9I is a front elevation view of the device of FIG. 2 showing a first partially completed label edit embodiment of a user interface.

FIG. 10B is a front elevation view of the device of FIG. 2 showing an ninth embodiment of a user interface displayed on the device.

FIG. 10C is a front elevation view of the embodiment of FIG. 10B, further including a human hand interacting with the user interface.

FIG. 10D is a front elevation view of the embodiment of FIG. 8, further including a human hand interacting with a third portion of the user interface.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1A:
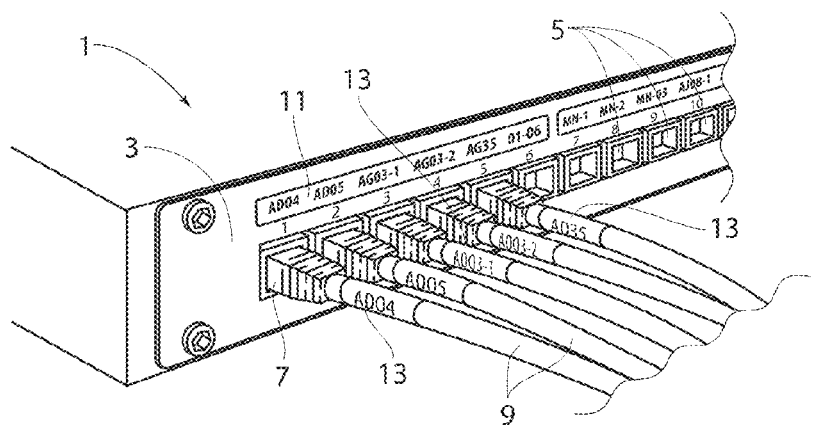
FIG. 1A is a perspective view demonstrating a use of labels, which may be printed using systems and methods according to the present invention.
Figure 1B:
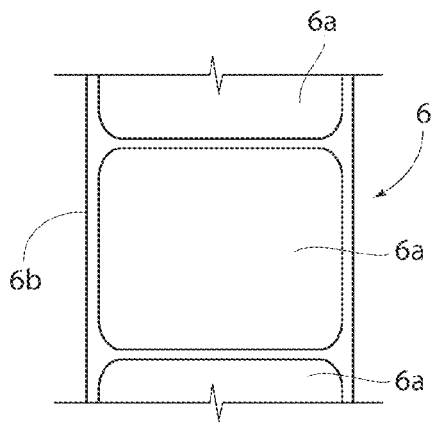
FIG. 1B is a front elevation view of a first embodiment of label media according to the present invention, including blank labels.
Figure 1C:
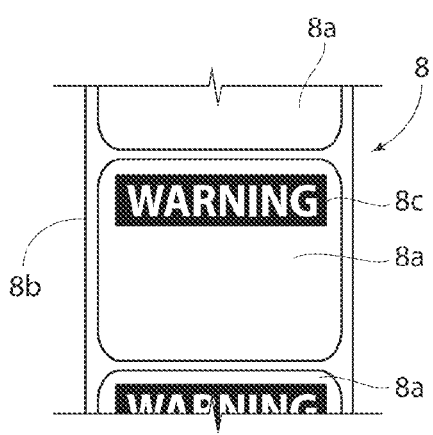
FIG. 1C is a front elevation view of a second embodiment of label media according to the present invention, including partially completed labels.
Figure 1D:
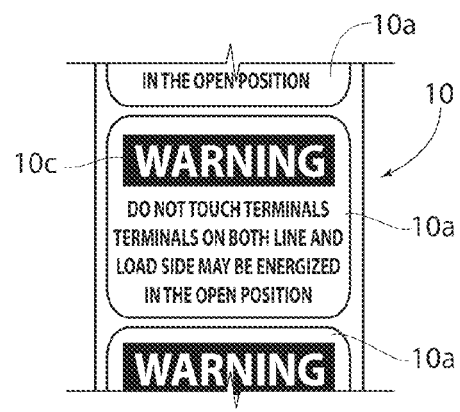
FIG. 1D is a front elevation view of a third embodiment of label media according to the present invention, including completed labels.
Figure 1E:
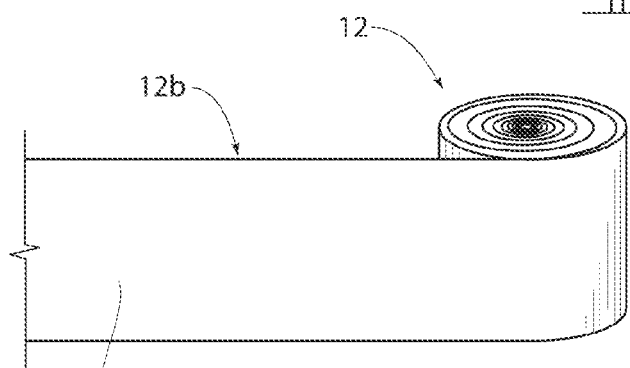
FIG. 1E is a front elevation view of a fourth embodiment of label media according to the present invention, including a continuous roll of blank label material.

Turning now to the figures, FIG. 1A provides a potential use of labels, which may be edited and/or printed according to the present invention. The depicted use includes a system 1 having a patch panel 3, which may include a number of cable ports 5, such as Ethernet cable ports. Into the ports 5 are received a plurality of Ethernet cable plugs 7 which terminate Ethernet cables 9. It may be desirable to print and adhere patch panel labels 11 to the patch panel 3 to identify one or more ports 5. It may also be desirable to print and adhere cable labels 13 to the cables 9 to distinguish and identify such cables 9, especially when the cables 9 are run for long distances, or through, under or around other structures, such as walls, ceilings, cabinets, etc. FIG. 1B provides an embodiment of label media 6 including a plurality of die cut, adhesive backed labels 6a, which are blank, removably adhered to a carrier backing paper 6b. Partially completed die cut, adhesive backed label media 8 is shown in FIG. 1C, including labels 8a which may have a predetermined content 8c, such as a title, graphic, or label color, removably adhered to a carrier backing paper 8b. The predetermined content 8c may be provided on the label media 8 prior to printing, or printed on blank media, such as blank media 6. Various titles may include "CAUTION" (preferably with yellow background), "DANGER" (preferably with red background), "NOTICE" (preferably with blue background), "WARNING" (preferably with orange background), and/or "SAFETY" (preferably with green background). FIG. 1D provides label media 10 including die-cut, adhesive-backed labels 10a, which may be provided with complete predetermined content 10c and printed as-is (a complete label), or edited according to the present invention. The labels 10a may be provided as temporarily adhered to a carrier backing paper 10b. While blank, cut labels 61 may be provided (as shown in FIG. 1B), blank label media may also be provided in a generally continuous roll 12, such as that shown in FIG. 1E. The continuous material 12, may be provided as an adhesive backed material 12a, temporarily adhered to a carrier backing paper 12b. On a continuous roll 12 of label media, once a label image (e.g. graphics and/or text) is printed on the adhesive backed material 12a, a label printer may automatically sever the media 12, so as to provide a trimmed label ready for application. Additionally, or alternatively, the media 12 may be cut or trimmed manually.

Figure 2:
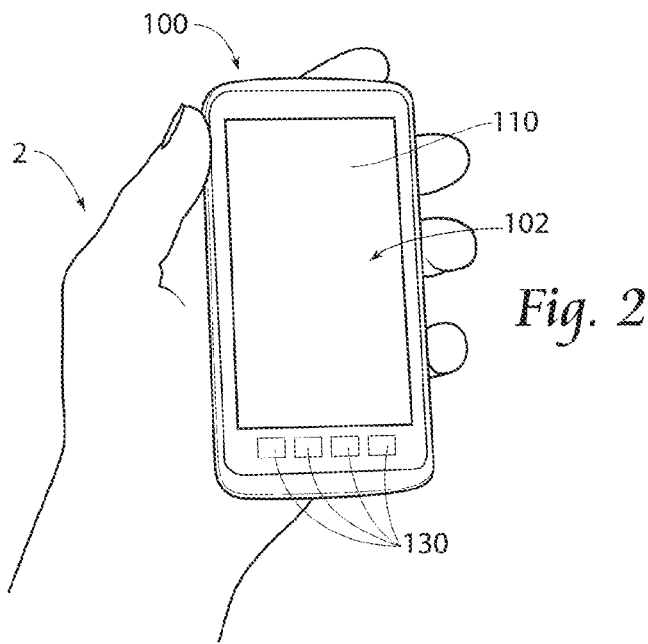
FIG. 2 is a front elevation view of a handheld electronic device in a human hand.

FIG. 2 provides an embodiment of an electronic handheld device 100 held in a human hand 2. The device 100 preferably is battery powered and has a user interface 102, which allows a user to receive information from and control at least some operation of the device 100. The device 100 preferably includes a microprocessor (not shown), which facilitates the transfer of electronic data between the user interface and a communications interface, such as a far-field radio frequency (RF) interface (e.g., cellular modem), or a near-field RF interface (e.g., Bluetooth®), or a cabled interface (e.g. universal serial bus (USB)). The device 100 preferably includes memory (not shown), accessible by the microprocessor, and may include random access memory (RAM) and/or nonvolatile memory (e.g. flash memory).

The user interface 102 may include a display screen 110, such as a touch screen (capacitive sensing display), as is known in the art. The user interface 102 may further include one or more hardware buttons 130, which may have permanent functionality, such as a power button. Additionally or alternatively, one or more hardware buttons 130 may have varying functionality, depending upon other aspects of the user interface 102, such as graphics displayed on the display 110, thereby rendering the hardware buttons 130 "softkeys."

Figure 3A:
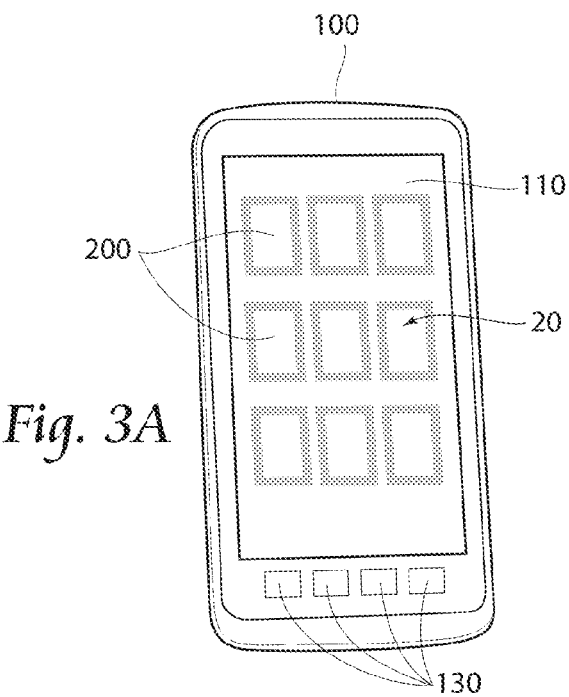
FIG. 3A is a front elevation view of the device of FIG. 1 showing a first embodiment of a user interface displayed on the device.
Figure 3B:
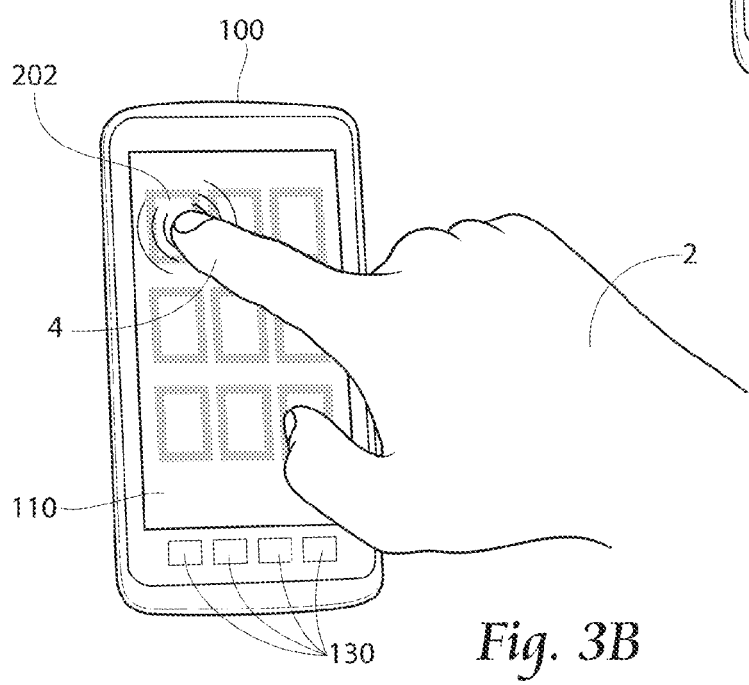
FIG. 3B is a front elevation view of the embodiment of FIG. 3A, further including a human hand interacting with the user interface.

FIG. 3A depicts a first embodiment 20 of a user interface displayed on the screen 110 of the electronic device 100. The interface 20 includes a plurality of graphical representations or icons 200 available for selection by a user. A computer application according to the present invention may be launched by the selection of one of the icons 200, which may be achieved through a direct user interaction with the display 110 or through direct user interaction with one or more of the buttons 130. FIG. 3B shows a finger 4 on a human hand 2 interacting with the capacitive display 110 on the device 100 to select an icon 202 to launch a computer application on the device 100.

A second embodiment 21 of a user interface displayed on the screen 110 of the device 100 is shown in FIG. 4. This interface 21 is preferably displayed on the screen 110 as a result of the user interaction with the device 100 as described in connection with FIGS. 3A and 3B. This interface 21 may provide one or more functional options to a user, including a first option or icon 210 to proceed to select a label for printing, a second option or icon 212 to allow access to control settings used by the computer application, and a third option or icon 214 to exit the computer application. After exiting the computer application, such as by selecting the third option 214, the screen 110 may display the first interface embodiment 20, which may be a device home-screen. If rather than exiting, a user selects the first option 210, as shown in FIG. 5, the display 110 may depict a third embodiment 22 of a user interface, as shown in FIG. 6, or even another embodiment 23, 23', or 23", as shown in FIGS. 8A-8C.

The third embodiment 22 of a user interface 102 according to the present invention is optional, but may provide a user with a plurality of functional options. A first option 220 may allow a user to proceed to view a list of existing label options, which may be complete ready-to-print labels, labels preformatted in a template form to be filled in by a user to be completed, custom labels previously created and saved in memory by a user, or a combination thereof. FIG. 7 shows a user selecting the first option 220 with the user's finger 4. A second option 222 may allow a user to proceed to a blank label of a predetermined or selectable size and create a custom label, including to select and insert graphics and/or text, for the user's particular labeling purpose. A third option 224 may allow a user to revert the display 110 back to the second interface 21 or the first interface 20.

Figure 8A:
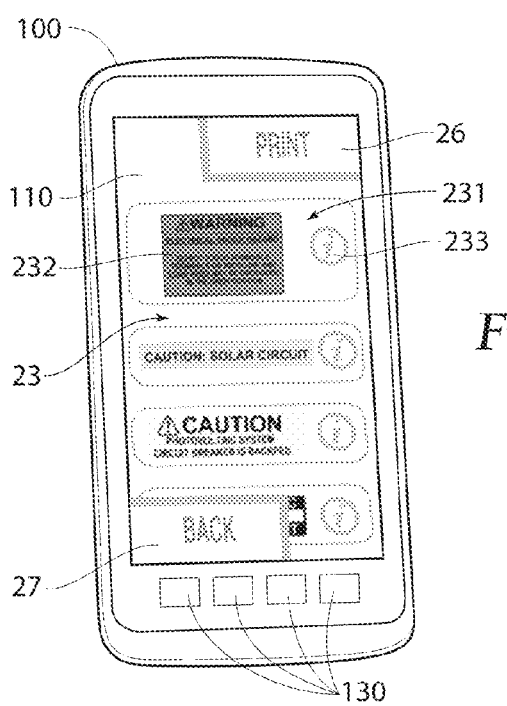
FIG. 8A is a front elevation view of the device of FIG. 2 showing a fourth embodiment of a user interface displayed on the device.
Figure 8B:
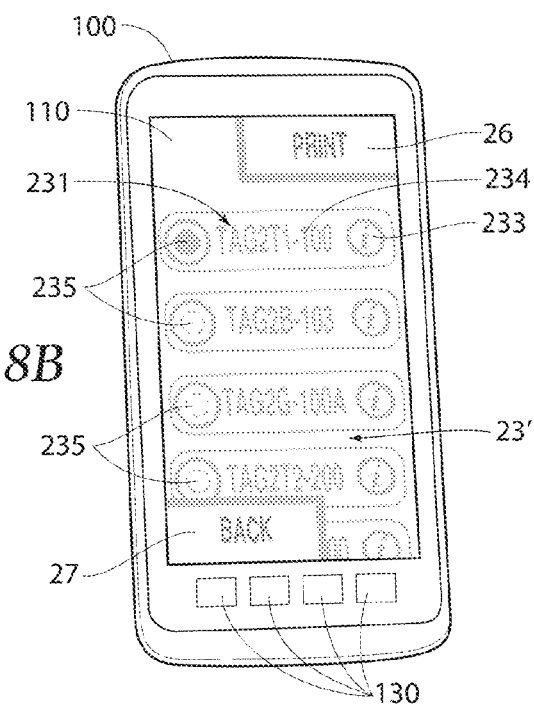
FIG. 8B is a front elevation view of the device of FIG. 2 showing a fifth embodiment of a user interface displayed on the device.
Figure 8C:
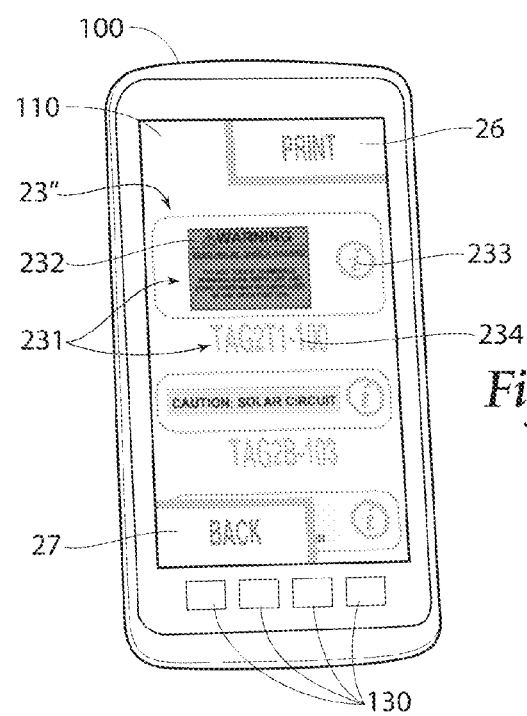
FIG. 8C is a front elevation view of the device of FIG. 2 showing a sixth embodiment of a user interface displayed on the device.

FIGS. 8A-8C present preferably alternative embodiments 23, 23', 23" of a user interface according to the present invention, displayed on the screen 110 of the device 100. One of these or other embodiments of the user interface may be displayed, for instance, after a user selects an option, such as the first option 220, on the third embodiment 22 of the user interface. Such embodiments preferably provide some identifying information 231 for one or more previously stored label designs.

Figure 9A:
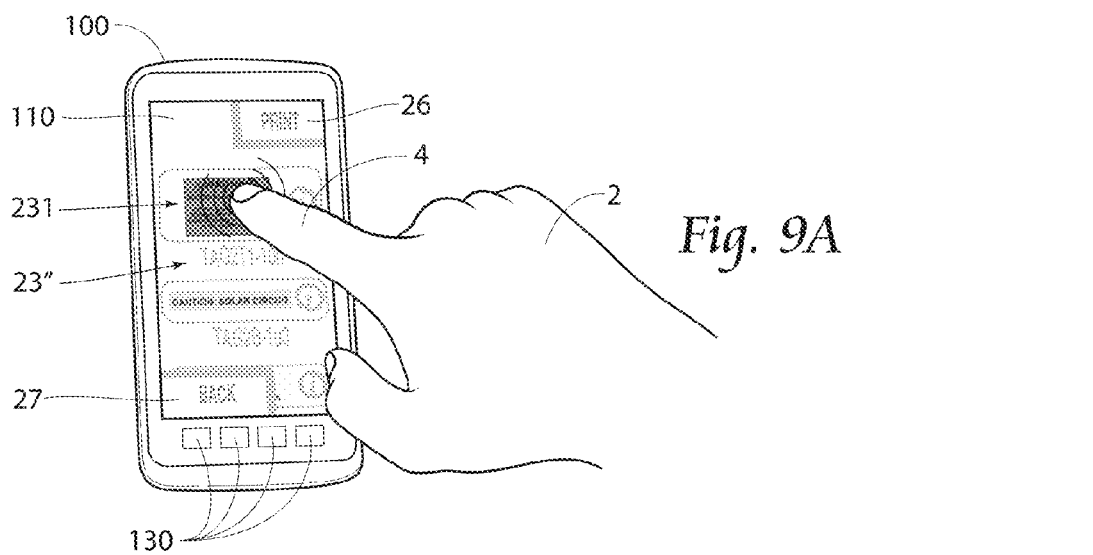
FIG. 9A is a front elevation view of the embodiment of FIG. 8C, further including a human hand interacting with a first portion of the user interface.
Figure 9B:
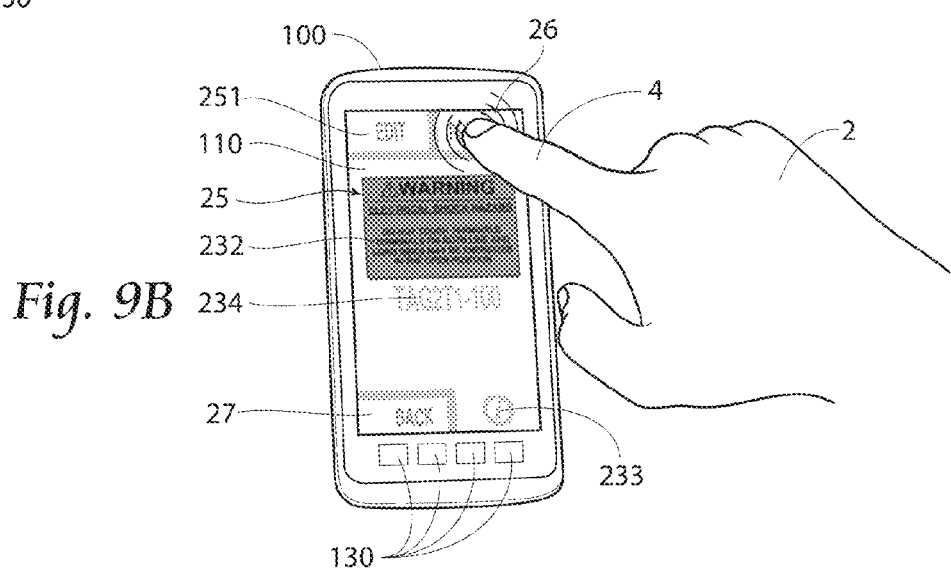
FIG. 9B is a front elevation view of the device of FIG. 2 showing a seventh embodiment of a user interface displayed on the device and a human hand interacting with the user interface.

In a fourth embodiment 23 of the user interface shown in FIG. 8A, the identifying information 231 may be a what-you-see-is-what-you-get (WYSIWYG) representation 232 of one or more labels. Furthermore, in addition to the identifying information 231, there is preferably a link or icon 233, which will allow a user to display regulatory information related to the particular associated identifying label information 231. The functionality provided in this fourth embodiment 23 includes label selectability (for review or edit), regulatory information review, label printing, and menu navigation. A label may be selected by, for example, a user tapping the screen 110 over the identifying information 231 for a predetermined period of time, such as less than two seconds, and more preferably less than one second. Once such touch is sensed by the device 110, at least a portion of the identifying information 231 may be highlighted, such as by changing a display background color or adding graphics to the display, such as a circle around the information 231 or a checkmark next to it. Once a portion of the identifying information 231 is highlighted, the label may be reviewed, edited, or printed as is. To review and/or edit the label design, a user may simply tap the screen 110 over the identifying information 231 a second time. Such second tap (as shown in FIG. 9A) may cause a WYSIWYG representation of a label to be displayed (as shown in FIG. 9B) upon which the label may be edited or printed. To print a label directly from the fourth interface embodiment 23, once the portion of identifying information 231 is highlighted, a print option 26 may be selected by the user. Selection of this print option 26 may cause a label to be printed (if the label design is complete), may prompt a user for more information (if the design is not yet complete), and/or may confirm that certain media (e.g., size/type of labels and/or ink and/or marking ribbon) is loaded into the printer. To review regulatory information related to a given label, an information option 233 is provided and displayed to a user, preferably visually associated with the identifying information 231, such as by proximity. Viewing of regulatory information will be more fully described in connection with FIGS. 10A-10D. Menu or user navigation may be provided by an exit or back option 27, upon the selection of which the display 110 may revert back to any of the first through third embodiments of the user interface.

Another, optional, fifth embodiment 23' of a user interface display is shown in FIG. 8B. In this embodiment 23', the identifying information 231 may be a descriptor 234 of a label, such as a specification number or description, of one or more labels. Furthermore, in addition to the identifying information 231, there is preferably a link or icon 233, which will allow a user to display regulatory information related to the particular associated identifying label information 231. The functionality provided in this fifth embodiment 23' includes label selectability (for review or edit), regulatory information review, label printing, and menu navigation. A label may be selected by, for example, a user tapping the screen 110 over the identifying information 231 for a predetermined period of time, such as less than two seconds, and more preferably less than one second. Once such touch is sensed by the device 110, at least a portion of the identifying information 231 may be highlighted, such as by changing a display background color or adding graphics to the display, such as a circle around the information 231 or a checkmark next to it. Or, as shown, a radio button 235 as known in the art, may be activated to indicate a selected label. Once a portion of the identifying information 231 is highlighted, the label may be reviewed, edited, or printed as is. To review and/or edit the label design, a user may simply tap the screen 110 over the identifying information 231 a second time. Such second tap may cause a WYSIWYG representation of a label to be displayed (as shown in FIG. 9B) upon which the label may be edited or printed. To print a label directly from the fifth interface embodiment 23', once the portion of identifying information 231 is highlighted, a print option 26 may be selected by the user. Selection of this print option 26 will cause a label to be printed (if the label design is complete) or will prompt a user for more information (if the design is not yet complete). To review regulatory information related to a given label, an information option 233 is provided and displayed to a user, preferably visually associated with the identifying information 231, such as by proximity. Viewing of regulatory information will be more fully described in connection with FIGS. 10A-10D. Menu or user navigation may be provided by an exit or back option 27, upon the selection of which the display 110 may revert back to any of the first through third embodiments of the user interface.

Yet another optional sixth embodiment 23" of a user interface is shown in FIG. 8C. In this embodiment 23", the identifying information 231 may be a what-you-see-is-what-you-get (WYSIWYG) representation 232 of one or more labels in combination with a descriptor 234 of such label, such as a specification number or description. Furthermore, in addition to the identifying information 231, there is preferably a link or icon 233, which will allow a user to display regulatory information related to the particular associated identifying label information 231. The functionality provided in this sixth embodiment 23" includes label selectability (for review or edit), regulatory information review, label printing, and menu navigation. A label may be selected by, for example, a user tapping the screen 110 over the identifying information 231 for a predetermined period of time, such as less than two seconds, and more preferably less than one second. Once such touch is sensed by the device 110, at least a portion of the identifying information 231 may be highlighted, such as by changing a display background color or adding graphics to the display, such as a circle around the information 231 or a checkmark next to it. Once a portion of the identifying information 231 is highlighted, the label may be reviewed, edited, or printed as is. To review and/or edit the label design, a user may simply tap the screen 110 over the identifying information 231 a second time. Such second tap (as shown in FIG. 9A) may cause a WYSIWYG representation of a label to be displayed (as shown in FIG. 9B) upon which the label may be edited or printed. To print a label directly from the sixth interface embodiment 23", once the portion of identifying information 231 is highlighted, a print option 26 may be selected by the user. Selection of this print option 26 will cause a label to be printed (if the label design is complete) or will prompt a user for more information (if the design is not yet complete). To review regulatory information related to a given label, an information option 233 is provided and displayed to a user, preferably visually associated with the identifying information 231, such as by proximity. Viewing of regulatory information will be more fully described in connection with FIGS. 10A-10D. Menu or user navigation may be provided by an exit or back option 27, upon the selection of which the display 110 may revert back to any of the first through third embodiments of the user interface.

Figure 9C:
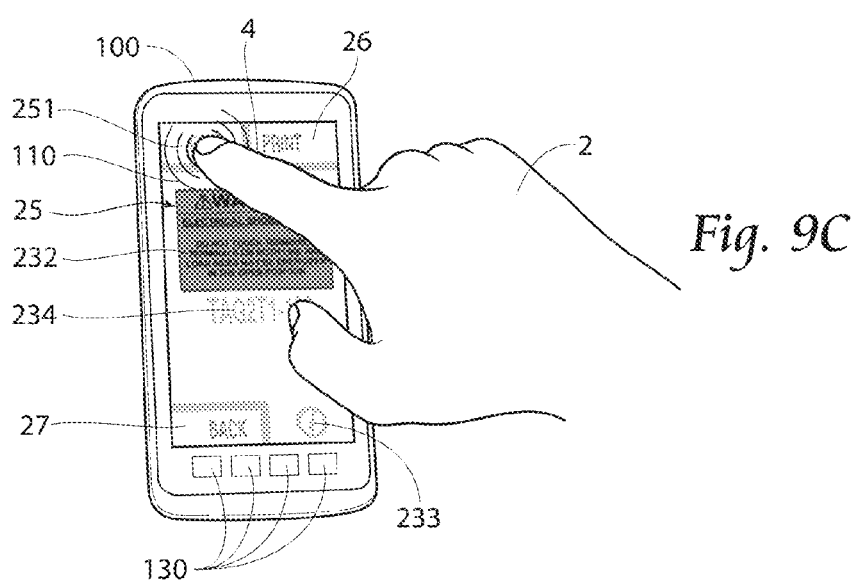
FIG. 9C is a front elevation view of the embodiment of FIG. 9B, further including a human hand interacting with a first portion of the user interface.
Figure 9D:
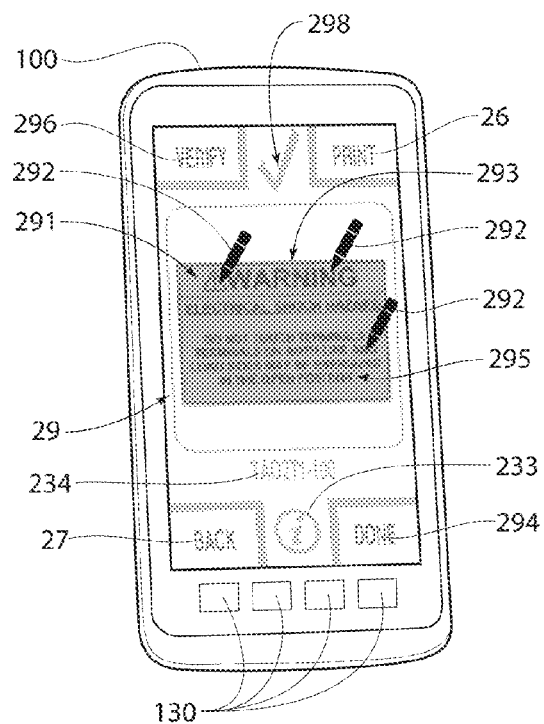
FIG. 9D is a front elevation view of the device of FIG. 2 showing an eighth embodiment of a user interface.
Figure 9E:
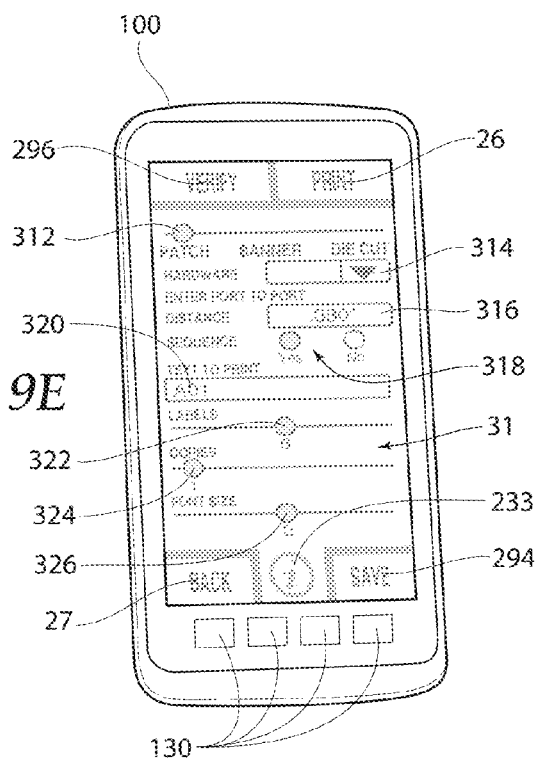
FIG. 9E is a front elevation view of the device of FIG. 2 showing a first blank label edit embodiment of a user interface.
Figure 9F:
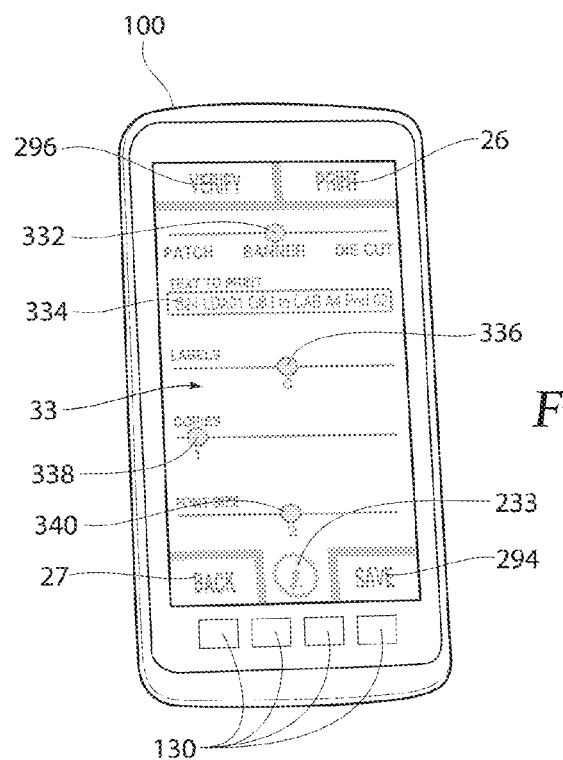
FIG. 9F is a front elevation view of the device of FIG. 2 showing a second blank label edit embodiment of a user interface.
Figure 9J:
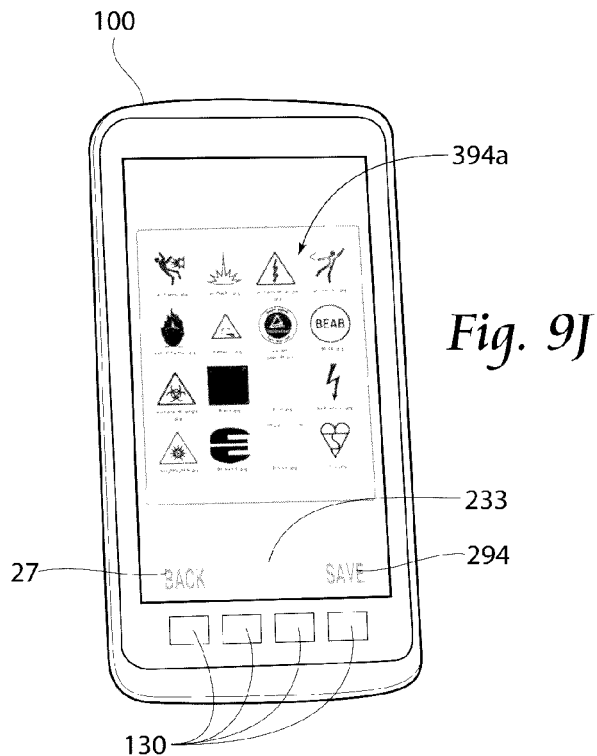
FIG. 9J is a front elevation view of the device of FIG. 2 showing an image selection embodiment of a user interface.
Figure 9K:
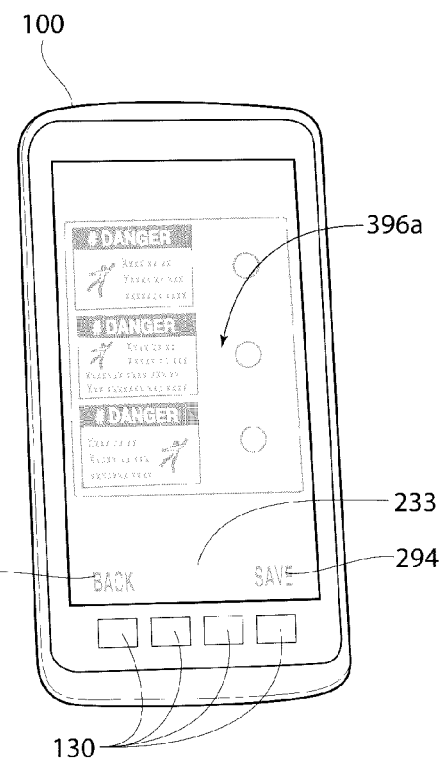
FIG. 9K is a front elevation view of the device of FIG. 2 showing a layout selection embodiment of a user interface.
Figure 9L:
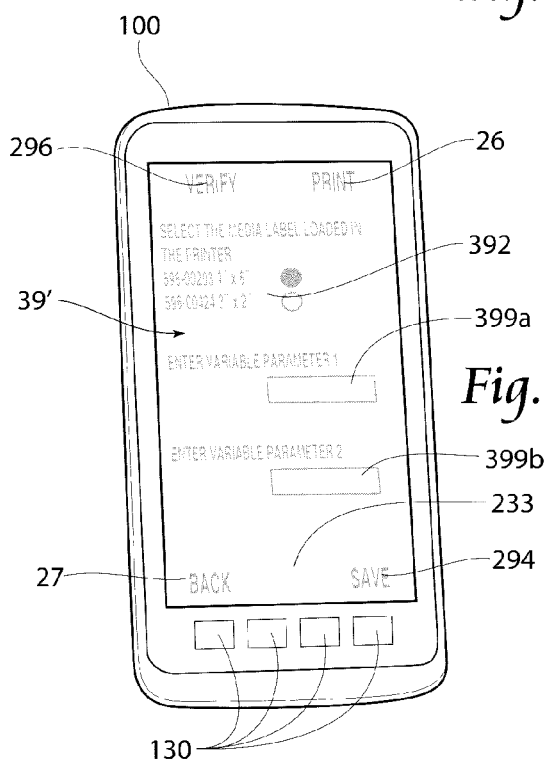
FIG. 9L is a front elevation view of the device of FIG. 2 showing a second partially completed label edit embodiment of a user interface.
Figure 9M:
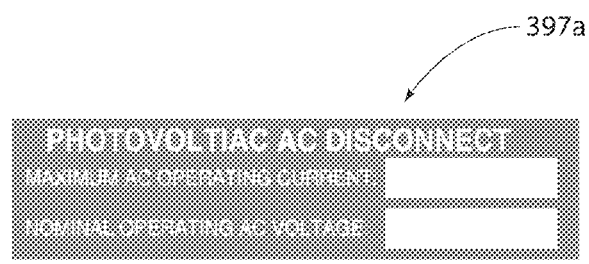
FIG. 9M is a front elevation view of a partially completed label media before printing.
Figure 9N:
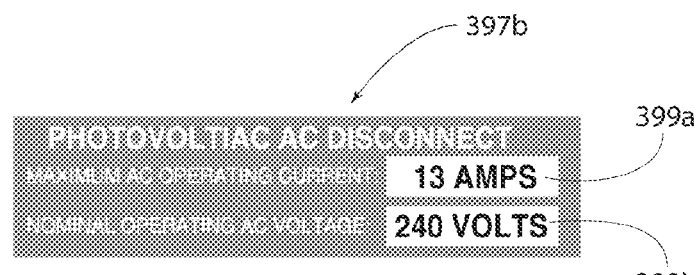
FIG. 9N is a front elevation view of the embodiment of FIG. 9M after label parameters were edited by the device of FIG. 2 and the label was printed.
Figure 10A:
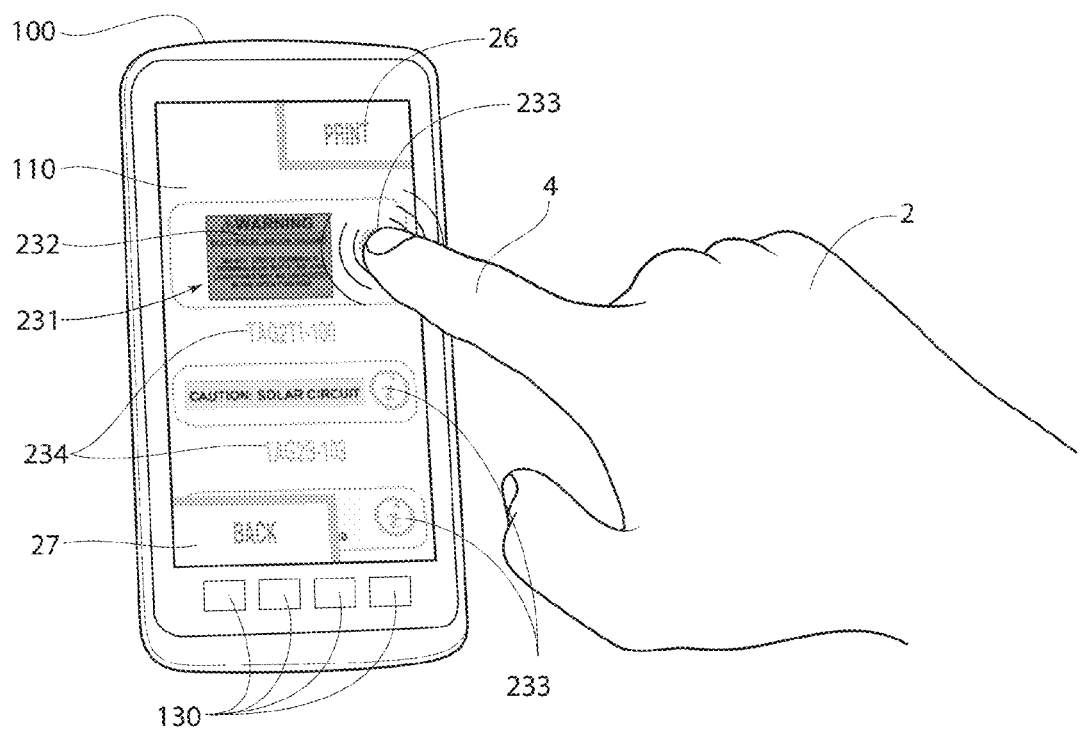
FIG. 10A is a front elevation view of the embodiment of FIG. 8, further including a human hand interacting with a second portion of the user interface.

With reference to FIGS. 9A-9N, methods related to label review and edit may be understood. In FIG. 9A, the sixth embodiment 23" of the user interface is controlled by a finger 4 of a human hand 2. A label may be selected as described above, and a WYSIWYG display 232 of such label may then be displayed, with or without a descriptor 234, as shown in an embodiment 25 of the display shown in FIG. 9B. This interface 25 provides several options to a user. First, a print option 26 and a back or exit option 27, as previously described, may be provided. Upon selection of the print option 26, the label as displayed 232 will be printed. To review regulatory information related to the displayed label 232, an information option 233 is provided and displayed to a user. Viewing of regulatory information will be more fully described in connection with FIGS. 10A-10D. Menu or user navigation may be provided by the exit or back option 27, upon the selection of which the display 110 may revert back to any of the previous embodiments of the user interface, but more preferably revert back to one of the previously described user interface embodiments 23, 23', or 23".

The seventh embodiment 25 is preferably provided with an edit option 251 presented to the user. Upon selection of the edit option 251, as shown in FIG. 9C, the display 110 may switch to another embodiment 29 of a user interface. In this embodiment 29, the WYSIWYG label 232 from the prior display 25 is shown, but one or more portions of the label may now be modified by a user. For instance, a graphic portion 291 may be presented as editable, and indicated as such by highlighting or additional graphic indication, such as an image of a pencil 292. If an editable graphic portion is presented to a user, the user may select such editable portion, such as by a single tap of a finger on the display 110, which will cause a display of selectable graphics, either provided to or designed by or on behalf of the user. The user may then select a preferred graphic to be placed in the editable portion 291. Additionally or alternatively, one or more editable text portions may be provided. For instance, a title text portion 293 may be provided and indicated as editable by the presence of a pencil graphic 292 associated therewith. Another body text portion 295 may be provided and indicated as editable by the presence of a pencil graphic 292 associated therewith. The title text portion 293 may have a font of a first font size and the body text portion 295 may have a font of a second font size. While the first and second font sizes may be the same, they are preferably different, with the first font size being larger than the second. When an editable text portion is selected, such as by a single tap of the display 110 over such portion, the display changes to provide access to change the text portion and, preferably, a full QWERTY keyboard or number pad display (0-9) so as to allow the user to edit the selected text portion. Additionally, options to change font size may be provided. For instance, three different font sizes (e.g. small (12 point), medium (22 point), and large (26 point)) may be available to choose from. Alternatively, font size may be predetermined and/or adjusted automatically.

This embodiment 29 of the user interface may further include an information icon 233 as previously described, a selection of which will display regulatory information (as further described below) related to the label that was originally displayed on the prior embodiment 25 of the user interface, or that is identified on this embodiment 29, such as by a descriptor 234. A variety of options may be displayed for use, such as use when a user is finished with the editing process on the label. For instance, a done option 294 may be displayed, which may cause the label edits to be saved, and the user interface may revert back to the previous interface 25, which will then display a WYSIWYG representation of the label as edited by the user.

Additionally or alternatively, the edited label 232 may be verified against the regulatory requirements for such label. A verify option 296 may be provided so as to provide a user with the option of comparing the label image, as edited, with any regulatory requirements that are accessible to the software program, such as requirements held in a database, stored on the device 100 or remotely yet accessible by the device 100. A verification indicator 298, such as a green checkmark, as shown, or a red "X" (not shown) may be displayed on the screen 110 to indicate the edited label image compliance or noncompliance, respectively, with the accessible regulatory requirements. If the label image is not in compliance, portions of the label image that are not in compliance may be highlighted for correction. Additionally or alternatively, the verification process may be performed automatically upon the user's edit of a given graphic or text portion of the label image. That is, once a graphic portion or text portion has been edited by a user, the application software may run an automatic verification to determine whether the most recent edit made to the label maintains compliance with available regulatory requirements. The verification indicator 298 may then be automatically updated, depending upon the results of such determination.

Alternative or additional embodiments of label editing user interfaces are provided in FIGS. 9E-9N. FIG. 9E depicts another embodiment 31 of a user interface 102 provided on the device 100 for the editing of a label image to be printed on label media. This embodiment 31 provides a label type selector 312, a known hardware selector 314, a port spacing input 316, a sequence selector 318, a label text input box 320, a sequence count selector 322, a quantity selector 324, and a font size selector 326. The label type selector 312 allows a user to identify a type of label and/or label media to be used, thereby presenting a hierarchical menu system, which may be based, as shown on a selectable label media characteristic, such as a physical label media configuration and/or predetermined printed matter (e.g., text and/or graphic shapes) on label media to be used for printing. A first menu option, as shown selected, may be for patch panel labels. As used herein, a patch panel label is intended to be adhered to a panel having one or more plug receptacles, such as receptacles for receiving audio cable or Ethernet cable plugs, for example. The port spacing input 316 allows a user to input an on-center distance, such as in inches, millimeters, or centimeters, between the various plug receptacles on the panel to be labeled. Certain panel hardware may be pre-programmed or recognized by the device 100, and selected by a user using the hardware selector 314. If hardware is selected, then the port spacing input 316 may be deactivated, or default value shown, because the spacing is known as being associated with the selected hardware. The label text input box 320 provides a user with the ability to specify text to be printed on a first label or portion of a patch panel label. The text may be entered as alphanumeric and/or symbol characters. The sequence selector 318 is preferably a binary option, such as a yes/no option or active/deactive option. The sequence selector 318 works in conjunction with the sequence count selector 322. If the sequence selector 318 is active (e.g., "yes"), then a user may select the number of sequenced labels to be printed by using the sequence count selector 322. When activated, the sequence selector 318 will cause a series of text groupings to be printed on a banner label media, and each successive text grouping to be printed will be sequenced in some order with respect to the previous text grouping. Each text grouping may include one or more alphanumeric and/or symbol characters. For instance, if the sequence selector 318 is set to "yes", the text input is "A01", and the sequence count selector 322 is set to "6", and the print option 26 is selected, then a printer, which may be separate and apart from, but in communication with, the device, will print a patch panel label with the text groupings "A01", "A02", "A03", "A04", "A05", and "A06". Each grouping would be centered at a spacing defined by the port spacing input 316 or at a spacing associated with a selected hardware 314. Different parts of the text groupings could be sequenced, such as any character or set of characters. For example, if the sequence selector 318 is set to "yes", the text input is "A01", and the sequence count selector 322 is set to "6", and the print option 26 is selected, then a printer, which may be separate and apart from, but in communication with, the device, may instead print a patch panel label with the text groupings "A01", "B01", "C01", "D01", "E01", and "F01"; or "A01", "B02", "C03", "D04", "E05", and "F06"; or "A01", "A11", "A21", "A31", "A41", and "A51". The type of sequencing may be specified by a user. The quantity selector 324 may be adjusted by a user to specify the number of patch panel labels to print and the font size selector 326 may be used to adjust font size to be printed on the patch panel labels. The font size selector 326 may be limited by one or more of the hardware selector 314, the spacing input 316, and a specification of expected or actual label media to be printed on. A save option 294 allows a user to save the present settings to memory in the device 100 as a label design for later recall, verification, edit, and/or printing. A back option 27 will cause the display of this embodiment 31 to be removed from the display 110, preferably causing display of a user interface 102 that appeared on the display 110 just temporally previous to this embodiment 31. This screen 31 may further include an information icon 233 as previously described, a selection of which will display regulatory information (as further described below) related to the label that is identified or defined on this embodiment 31. A verify option 296 may be provided so as to provide a user with the option of comparing the defined label with any regulatory requirements that are accessible to the software program, such as requirements held in a database, stored on the device 100 or remotely yet accessible by the device 100.

FIG. 9F provides a banner label display 33 on the user interface 102. This embodiment 33 provides a label type selector 332, a label text input box 334, a sequence count selector 336, a quantity selector 338, and a font size selector 340. The label type selector 332 allows a user to identify a type of label and/or label media to be used; in this case a continuous banner material has been selected. As used herein, a banner label is intended to be adhered to a panel and may specify a source panel or port and a destination panel or port, for example. The label text input box 334 provides a user with the ability to specify text to be printed on a first label or portion of a banner label. The text may be entered as alphanumeric and/or symbol characters. The sequence count selector 336 may allow a portion of the text for the label to be incremented to allow for sequential printing of labels without user interaction required for each sequential label. If the sequence count selector 336 is set to any other number than 1, then it will specify a number of sequenced labels to be printed. This will cause a series of text groupings to be printed on label media, and each successive text grouping to be printed will be sequenced in some order with respect to the previous text grouping, as previously described with respect to the sequence count selector 322. The quantity selector 338 may be adjusted by a user to specify the number of banner labels to print and the font size selector 340 may be used to adjust font size to be printed on the banner labels. The font size selector 340 may be limited by a specification of expected or actual label media to be printed on. A save option 294 allows a user to save the present settings to memory in the device 100 as a label design for later recall, verification, edit, and/or printing. A back option 27 will cause the display of this embodiment 33 to be removed from the display 110, preferably causing display of a user interface 102 that appeared on the display 110 just temporally previous to this embodiment 33. This screen 33 may further include an information icon 233 as previously described, a selection of which will display regulatory information (as further described below) related to the label that is identified or defined on this embodiment 33. A verify option 296 may be provided so as to provide a user with the option of comparing the defined label with any regulatory requirements that are accessible to the software program, such as requirements held in a database, stored on the device 100 or remotely yet accessible by the device 100.

A print option 26 is provided to instruct a printer, which may be separate and apart from, but in communication with, the device 100, to print a banner label with the text specified by a user in the label text input box 334.

FIG. 9G displays an embodiment 35 of a user interface 102 that may be used to create, edit, and/or instruct a printing of a die cut label. This embodiment 35 provides a label type selector 352, a label text input box 354, a sequence count selector 356, a quantity selector 358, and a label media selector 360. The label type selector 352 allows a user to identify a type of label and/or label media to be used; in this case a die cut label material has been selected. As used herein, a die cut label media is label media that is provided in discrete elements intended to be separately printed, separately removed from a backing material, and adhered to a panel and may specify functionality, provide a warning, or simply some form of identification, for example. The label text input box 354 provides a user with the ability to specify text to be printed on a first die cut label. The text may be entered as alphanumeric and/or symbol characters. The displayed size of the label text input box 354 may be preferably provided in a WYSIWYG representation of the label media selected by the label media selector 360. While there may be provided a predetermined number of predetermined size font characters available for print in each of the horizontal and vertical directions on the displayed label, the font entered into the label text input box 354 alternatively may resize dynamically if a horizontal and/or vertical border of the box will not support a font size as is being entered. The sequence count selector 356 may allow a portion of the text for the label to be incremented to allow for sequential printing of labels without user interaction required for each sequential label. If the sequence count selector 356 is set to any other number than 1, then it will specify a number of sequenced labels to be printed. This will cause a series of text groupings to be printed on label media, and each successive text grouping to be printed will be sequenced in some order with respect to the previous text grouping, as previously described with respect to the sequence count selector 322. The quantity selector 358 may be adjusted by a user to specify the number of die cut labels to print and the label media selector 360 may be used to select a target die cut label media to be printed upon. Selection of the label media selector 360 may redirect a user to a user interface 37 as shown in FIG. 9H, which may provide a listing 372 of label media options, one of which may be selected by using radio buttons 374, for example. Returning now to FIG. 9G, a save option 294 allows a user to save the present settings to memory in the device 100 as a label design for later recall, verification, edit, and/or printing. A back option 27 will cause the display of this embodiment 35 to be removed from the display 110, preferably causing display of a user interface 102 that appeared on the display 110 just temporally previous to this embodiment 35. This screen 35 may further include an information icon 233 as previously described, a selection of which will display regulatory information (as further described below) related to the label that is identified or defined on this embodiment 35. A verify option 296 may be provided so as to provide a user with the option of comparing the defined label with any regulatory requirements that are accessible to the software program, such as requirements held in a database, stored on the device 100 or remotely yet accessible by the device 100. A print option 26 is provided to instruct a printer, which may be separate and apart from, but in communication with, the device 100, to print a banner label with the text specified by a user in the label text input box 354.

An alternative die cut user interface embodiment 39 is shown in FIG. 9I. This embodiment 39 includes a label media selector 392, an image selection option 394, a layout selection option 396, and a label display area 398. The label media selector 392 provides a listing of label media options, one of which may be selected by using radio buttons, for example. If a user desires to add a pictographic image to the label design, the image selection option 394 may be selected, which may redirect the user to a display of available images, such as images displayed in a matrix orientation 394*a* as shown in FIG. 9J. Upon selection of an image icon in the matrix 394*a*, and/or selection of the back option 27 or save option 294, the user will be returned to the previous screen 39. A user may select the layout of the label, so as to select positioning of a selected image (if any) with respect to entered textual information. The layout selection option 396 may be selected by a user, which will direct a user to a display, such as that shown in FIG. 9K, providing a listing 396*a* of WYSIWYG label layouts and respective selectable radio buttons, for example. Upon selection of a desired layout from the list 396*a*, and/or selection of the back option 27 or save option 294, the user will be returned to the previous screen 39. In the label display area 398, a selected image (if any) and text entry space will be displayed to a user in the layout selected. The user may enter text to be displayed in the label design. The text may be entered as alphanumeric and/or symbol characters. The displayed size of the label display area 398 may be preferably provided in a WYSIWYG representation of the label media selected by the label media selector 392. While there may be provided a predetermined number of predetermined size font characters available for print in each of the horizontal and vertical directions on the displayed label, the font entered into the label display area 398 alternatively may resize dynamically if a horizontal and/or vertical border of the box will not support a font size as is being entered.

FIG. 9L provides an embodiment 39' of a variable parameter label definition interface according to the present invention. In this interface, a user is provided with one or more text entry boxes 399*a/b* with prompts to enter information to be displayed in predetermined locations on a predetermined label design specified by a label media selector 392. FIG. 9M provides an embodiment 397*a* of a die cut label media to be printed, including a plurality of variable parameters. FIG. 9N depicts the same label media as shown in FIG. 9M, but this embodiment 397*b* has been printed with a first variable parameter 399*a* and a second variable parameter 399*b* entered by a user through a device and/or method according to the present invention, such as through the variable parameter label definition interface 39'. Alternative menu systems are also envisioned, such as including a database search function that accepts an alpha-numeric query from a user through the user interface 102 and compares said query against an intended use or alpha-numeric identifier that is associated with a label or representation of a label in the database accessible to the device 100. The search function may then return, from the database and as a result of the comparison, for display on the display 110, a list of labels or label representations related to the intended use or alpha-numeric identifier in the database.

Turning now to FIGS. 10A-10D, an embodiment of a method of displaying regulatory information related to a given label may be understood. In a first step, on an electronic device 100 there is displayed label information 231, which may include a WYSIWYG representation 232 and/or descriptor 234 of a label. Associated with the information 231 is an information link or icon 233, the selection of which will change the displayed user interface 102 to show details of regulatory information related to the given label information 231. As used herein, the phrase "regulatory information" generally refers to guidelines for the printing of a label. The guidelines may be established by a governmental body (e.g., state government requirements or guidelines (legislation or administrative code), U.S. Food and Drug Administration (FDA), U.S. Department of Agriculture (USDA), U.S. Occupational Safety and Health Administration (OSHA)), a standard setting or trade organization (e.g., Institute of Electrical and Electronics Engineers (IEEE), International Telecommunication Union (ITU), International Code Council (ICC), National Fire Protection Association (NFPA), American National Standards Institute (ANSI)), a certification organization (e.g. Underwriters Laboratories (UL), the Wi-Fi Alliance), or even a user, owner, or programmer of the device 100. Such guidelines may include the National Electric Code (NEC) published by the NFPA and/or the International Fire Code (IFC) published by the ICC.

Upon selection of the information icon 233, the regulatory information may be presented in text and/or graphic form 312 to a user, who may scroll through and review the text. After a user is done reviewing the regulatory information, the back option 27 may be selected to return the user to the user interface display from which the regulatory information display 31 was accessed. When the user is satisfied that the label has been selected and/or edited appropriately, the user may select a print option 26 to instruct a label printer to print the selected label. It should be understood that the regulatory information display 31 may be preferably accessible from any other user interface display where a label or label media type is identifiable and/or selectable.

Figure 11:
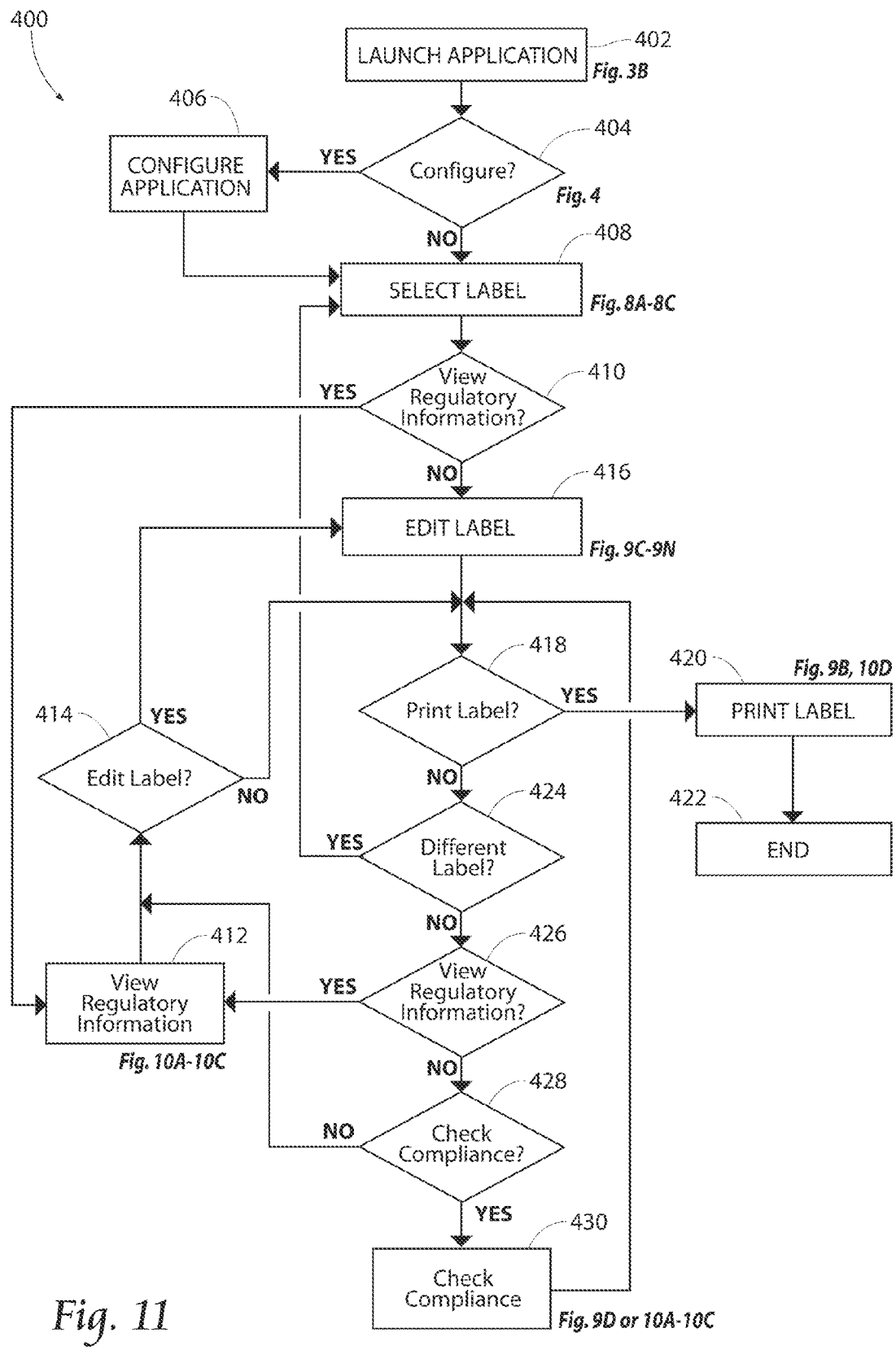
FIG. 11 is a flowchart of an embodiment of a method according to the present invention.

FIG. 11 provides a flowchart of an embodiment of a method according to the present invention. In a launch step 402, a computer application is launched or started on an electronic device, such as the handheld electronic device 100 discussed above. The launch step 402 may be the result of user interaction with a user interface 102 of an active, powered-on device 100 or may be the result of the device being powered on, such as by a power switch or button. After the application is launched, a user may be presented with a variety of user interface options, such as an option to configure 404 the application. If the user desires to configure the application, various application settings, as discussed above, may be adjusted by the user in one or more application configuration steps 406. Eventually, if the user configures the application or not, a label selection step 408 is executed by the user. Such selection step 408 may include the display and/or review of a WYSIWYG representation of the selected label. After a label has been selected, a user has an option 410 to view regulatory information 412 associated with the selected label, such as by selecting an information link or icon on the user interface 102 of the device 100. In the regulatory information viewing step 412, regulatory information related to the selected label is displayed on the user interface 102 for review by the user. After a user is done reviewing the regulatory information, or if the user elected not to review the regulatory information, the user may be presented with an option 414 to edit the selected label 416. Alternatively, some label designs may not be able to be edited by a user, in which case such option 414 may not be provided. If the user elects to edit the selected label, one or more label editing steps 416 are undertaken. In a label editing step 416, the user may alter the appearance of the label image (including text) to be printed, and to select or specify one or more of a plurality of printing options, as previously described herein. After a user has edited a label image 416, or if the user elects not to edit the label, a user may be presented with an option 418 to print the selected label 420, after which the method is preferably complete 422. If the user elects not to print the selected and/or edited label yet, the user may be presented with an option 424 to select a different label 408, an option 426 to view regulatory information 412 related to the selected and/or edited label, and/or an option 428 to check compliance 430 of the selected and/or edited label with regulatory guidelines that may govern one or more aspects of a label to be created from the selected and/or edited label image.

If the user elects to select a different label, the user is returned to the label selection step 408, in which the user chooses from a variety of predetermined or blank label templates to review, edit, and/or print. If the user elects to view regulatory information 412, regulatory information related to the selected and/or edited label is displayed on the user interface 102 for review by the user. These guidelines may be defined by a governmental agency, trade association, or user of the device 100, as previously described. If the user elects to check compliance 430 of the selected and/or edited label with regulatory guidelines that may govern one or more aspects of a label to be created from the selected and/or edited label image, a comparison is made between one or more attributes (e.g. image(s), color(s), and/or text) of the selected and/or edited label image and one or more regulatory information attributes associated with such selected label style to determine whether the label attributes fall within the regulatory information attributes. For instance, regulatory information for a given label may include an attribute that requires a title having a predetermined font size, such as a font of a specific size, or within a font size range. In the compliance verification or check step 430, the size of the title provided on the selected label is examined to determine if the label title font is of the predetermined font size. While printing of a label that is not in compliance with regulatory information may be prevented from being printed, it is preferred to allow a user to control whether a label will be printed or not. Thus, after compliance is checked 430, a user may be offered the option to print the label, edit the label, or select a different label. It is to be understood that, in the method described with reference to FIG. 11, the options (404, 410, 414, 418, 424, 426, and 428) may be provided serially to a user or a plurality of the options may be provided at once where a user may select one. Accordingly, any pair of option and associated step (404/406, 410/412, 414/416, 418/420, 424/408, 426/412, or 428/430) may be provided and executed in any number of ways, though generally after the print step 420, the method will be complete 422.

Figure 12A:
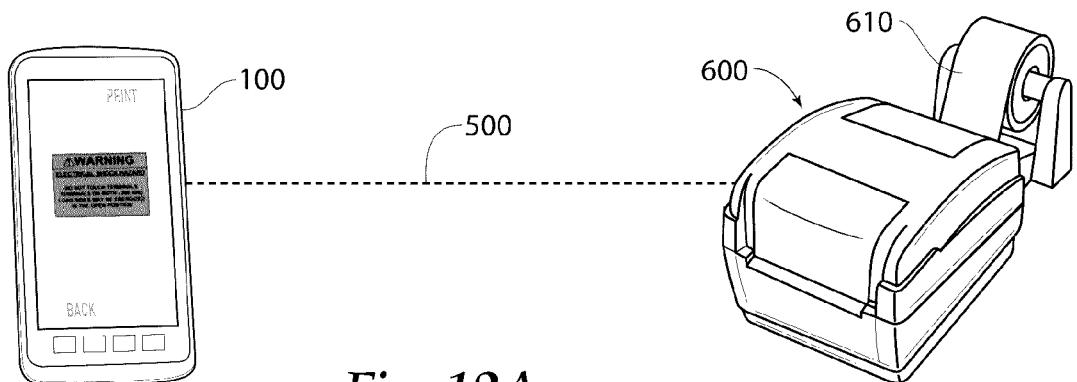
FIG. 12A is a first embodiment of a system according to the present invention, including a handheld electronic device and a label printer.
Figure 12B:
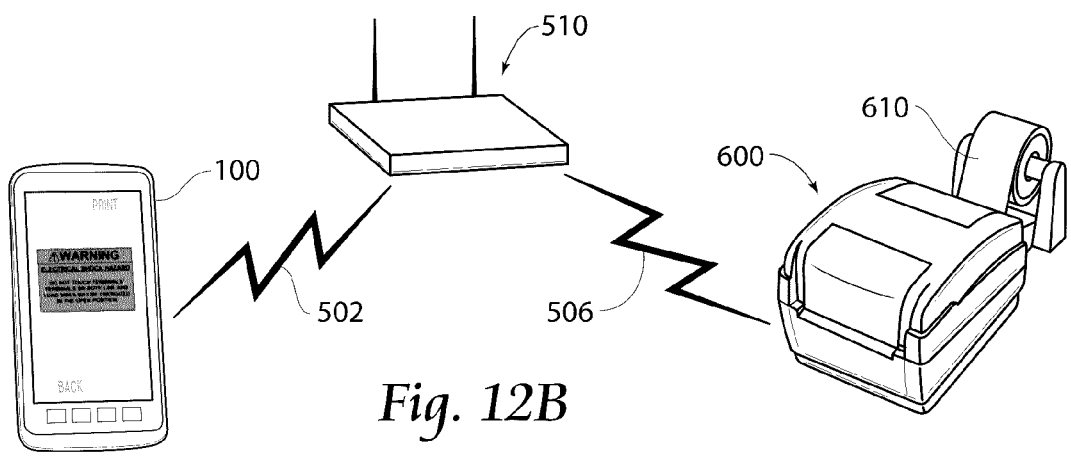
FIG. 12B is a first embodiment of a communication arrangement between the device and printer of FIG. 12A.
Figure 12C:
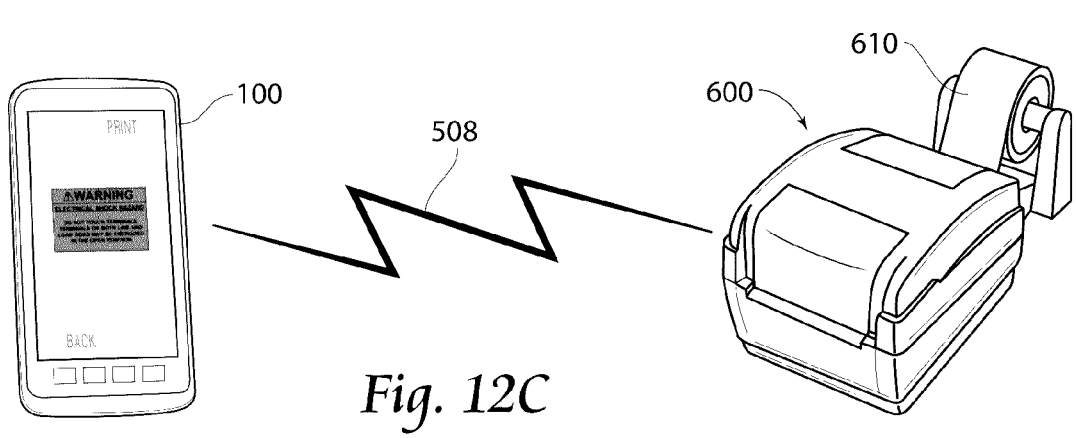
FIG. 12C is a second embodiment of a communication arrangement between the device and printer of FIG. 12A.

While heretofore the review, selection, and optional editing of a label for printing has been described, it is likely that a user will want to actually print a label, such as an adhesive label, to be used on a product, for example. While the handheld device 100, itself, may be a label printer, in a preferred embodiment, the handheld device is not a label printer but rather communicates with a label printer. FIG. 12 depicts a handheld device 100 in communication 500 with a label printer 600, such as a desktop label printer including loaded label media 610. The communication 500 between the device 100 and the printer 600 may be configured a variety of ways, such as direct connection hardwire, using a communication protocol such as the Universal Serial Bus (USB) protocol, or even a custom cable and communication protocol stack. Additionally or alternatively, as shown in FIG. 12B, the communication 500 between the device 100 and the printer 600 may be over a network connection, such as wired or wireless communications 502 between the device 100 and a router 510, and wired or wireless communications 506 between the router 510 and the printer 600. Such wired communications may be provided, e.g., over an Ethernet connection or even a USB connection. Wireless communications may be provided according to known wireless communications protocols, such as cellular, IEEE 802.11, Bluetooth®, IrDA, or proximity transfer. Additionally or alternatively, the device 100 and printer 600 may be capable of direct wireless communication 508, as shown in FIG. 12C, according to any of such protocols.

Figure 13:
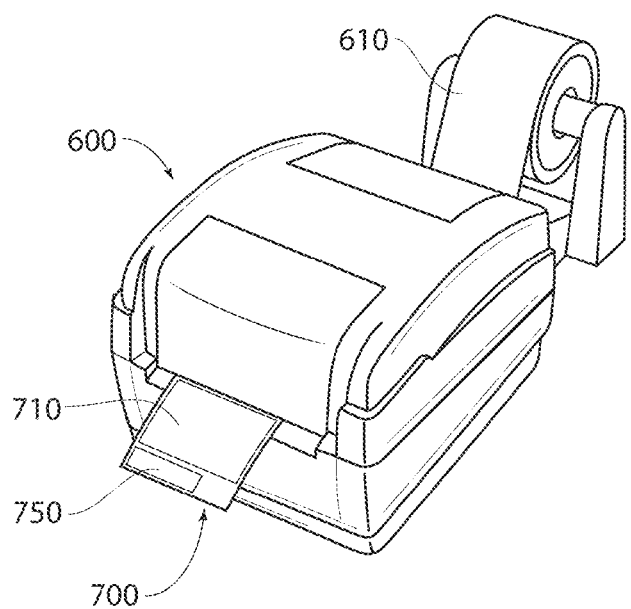
FIG. 13 is an embodiment of a label printer having printed an embodiment of a label according to the present invention.
Figure 14:
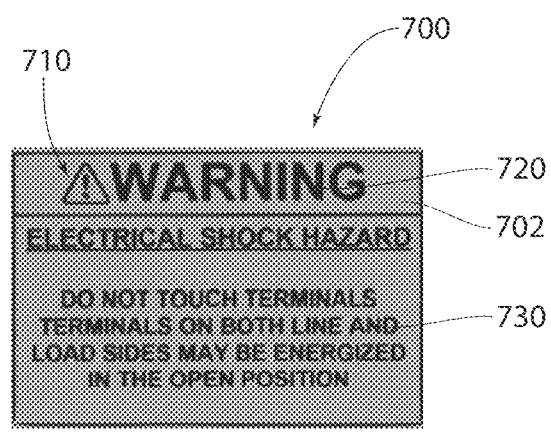
FIG. 14 is a first embodiment of a label having been printed according to the present invention.
Figure 15:
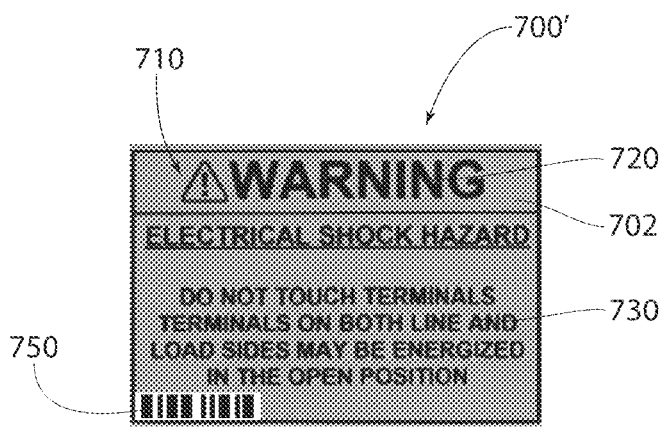
FIG. 15 is a second embodiment of a label having been printed according to the present invention.

FIG. 13 depicts a label printer 600 including label media 610 loaded and ready for printing. The printer 600 may have received print instructions from a separate electronic device. This printer 600 is capable of printing a label 700 including one or more printed areas. In a first printed area 710 is provided label information, such as a pictographic image and/or textual information as specified and/or selected by a user using the separate electronic device, as previously described herein. A label 700 including only user specified, selected, or predetermined information may be seen in FIG. 14, including a header 710 including a background color 702 and title 720, and label text 730. In a second printed area 750, while it could provide information specified or selected by a user, it preferably prints a code that identifies whether or not the printed label 700 is in compliance with regulatory information associated with the label in a database provided on or otherwise accessible by the separate electronic device (e.g., device 100) or printer 600. Such code may be a bar code, quick response (QR) code, an alphanumeric verification code, or even a verification image, such as a green checkmark (if compliant) or red X (if noncompliant) for example.

Referring back again to FIG. 4, a settings option 212 may be displayed to a user, as a part of the second embodiment 21 or other embodiment of the user interface, which will allow a user to review and modify certain attributes used by the device 100. For instance, it may be desirable to allow a user to review and modify on the device 100 the destination address of the printer 600, which may be an internet protocol (IP) address, for example. Additionally or alternatively, a setting that may be viewed and modified is the type of printer 600 to which the device 100 will interface for label printing. The type of printer 600 may be used by the device 100, for example, for selecting and displaying possible label sizes, label medium options, font styles (e.g. "normal," "bold," or "italics"), justification of font on a label (e.g., left justification, center justification or right justification), media cutting options (e.g., label cutter enabled/disabled, and cut label media after entire print job or after each discrete label), etc. That is, the printing and/or communications capabilities of the printer 600 may be known to and/or accessible by the device 100, which will allow the device 100 to display options to a user that are compatible with the printer 600 at various points during label review, edit, and printing.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method of printing a label, said method comprising the steps of:
- in an image display step, displaying an image of a label on an electronic device in communication with a network storage database;
- in an editing step, editing said image to create an edited image and displaying said edited image on said electronic device;
- in an information display step, selectively displaying regulatory guidelines governing one or more aspects of the label to be created from said edited image retrieved from said network storage database on said electronic device;
- using said electronic device to compare one or more aspects of said edited image to said regulatory guidelines to determine whether said one or more aspects of said edited image comply with said regulatory guidelines;
- as a result of said comparison, displaying on said electronic device an indication of one of compliance and noncompliance with said regulatory guidelines;
- in an image transfer selection step, displaying transfer selection menu information on the electronic device received from a label printer in communication with said network storage database; and
- printing the label on the printer.

2. A method according to claim 1, wherein said electronic device is capable of transferring image data, which is used to display said image, to said second device.

3. A method according to claim 1, said method further comprising the step of:
- transferring said image from said electronic device to said label printer.

4. A method according to claim 3, wherein said transferring step occurs at least partially over a wireless electronic communications interface.

5. A method according to claim 1, wherein said regulatory information comprises regulatory guidelines governing one or more aspects of a label to be created from said image or said edited image, said method further comprising the step of:
- comparing one or more aspects of said image to said regulatory guidelines to determine compliance of said one or more aspects of said image with said regulatory guidelines.

6. A method according to claim 1, wherein said regulatory information comprises regulatory guidelines governing one or more aspects of a label to be created from said image, said method further comprising the step of:
- comparing one or more aspects of said image to said regulatory guidelines to determine compliance of said one or more aspects of said image with said regulatory guidelines.

7. A method according to claim 1, wherein said regulatory information comprises regulatory guidelines governing one or more aspects of a label to be created from said image and said guidelines are defined by a governmental agency.

8. A method according to claim 1, wherein said regulatory information comprises regulatory guidelines governing one or more aspects of a label to be created from said image and said guidelines are defined by a trade association.

9. A method according to claim 1, wherein said regulatory information comprises regulatory guidelines governing one or more aspects of a label to be created from said image and said guidelines are defined by a user of said electronic device.

10. A method according to claim 1, wherein said electronic device is capable of accessing said regulatory information through said network storage database to create one or more aspects of a label.

11. A method according to claim 1, wherein said electronic device is capable of storing and accessing said regulatory information from a memory database on the electronic device.

* * * * *